(«12») United States Patent
Wang et al.

(10) Patent No.: US 11,572,082 B2
(45) Date of Patent: Feb. 7, 2023

(54) DRIVING RISK ASSESSMENT AND CONTROL DECISION-MAKING METHOD FOR AUTONOMOUS VEHICLE

(71) Applicant: AUTOMOTIVE RESEARCH & TESTING CENTER, Changhua Hsien (TW)

(72) Inventors: Cheng-Hsien Wang, Changhua Hsien (TW); Tsung-Ming Hsu, Changhua Hsien (TW); Hsiang-Chieh Hsu, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 219 days.

(21) Appl. No.: 17/080,885

(22) Filed: Oct. 27, 2020

(65) Prior Publication Data

US 2022/0126869 A1 Apr. 28, 2022

(51) Int. Cl.
*B60W 60/00* (2020.01)
*B60W 40/02* (2006.01)

(52) U.S. Cl.
CPC ........ *B60W 60/0016* (2020.02); *B60W 40/02* (2013.01); *B60W 60/0027* (2020.02)

(58) Field of Classification Search
CPC ......... B60W 60/0016; B60W 60/0027; B60W 40/02
See application file for complete search history.

(56) References Cited

U.S. PATENT DOCUMENTS

| 11,288,861 | B2* | 3/2022 | Bosse | G06T 15/503 |
| 2018/0329418 | A1* | 11/2018 | Baalke | B60W 30/0956 |
| 2019/0293770 | A1* | 9/2019 | Subasingha | G01S 7/4873 |
| 2020/0005489 | A1* | 1/2020 | Kroeger | G06T 7/80 |
| 2021/0302168 | A1* | 9/2021 | Liu | G01C 21/3602 |
| 2021/0309223 | A1* | 10/2021 | Zhu | G01S 13/726 |
| 2022/0003855 | A1* | 1/2022 | Zhu | G01S 7/4914 |
| 2022/0227386 | A1* | 7/2022 | Aoki | G06V 10/62 |

\* cited by examiner

*Primary Examiner* — Yazan A Soofi
*Assistant Examiner* — Naeem Taslim Alam
(74) *Attorney, Agent, or Firm* — Bacon & Thomas, PLLC

(57) ABSTRACT

A driving risk assessment and control decision-making method for an autonomous vehicle includes: detecting the surrounding state of the vehicle multiple times to generate multiple sensing signals; quantifying the sensing signals to generate multiple sensing values and calculating a sensing average value of the sensing values; calculating a sensing error value between each sensing value and the sensing average value, a sensing error average value of sensing error values and a sensing error variation value; integrating the sensing error average value, the sensing error variation value and a sensor systematic error average value and a sensor systematic error variation value to generate a sensing signal correction value; combining the sensing values and the sensing signal correction value to generate multiple sensing signal reference values; judging whether a stability of the sensing signal reference values falls within a preset range; generating a control mechanism based on the judgement.

10 Claims, 8 Drawing Sheets

DRIVING RISK ASSESSMENT AND CONTROL DECISION-MAKING METHOD FOR AUTONOMOUS VEHICLE

BACKGROUND OF THE INVENTION

1. Field of the Invention

The invention relates to a driving risk assessment and control decision-making method, in particular to a driving risk assessment and control decision-making method for an autonomous vehicle.

2. Description of the Prior Arts

Autonomous driving technology is one of the currently booming technologies. Normally autonomous driving requires sensors to detect information in the surrounding environment to automatically control the vehicle in different situations such as traffic intersections, lane changes, and acceleration and deceleration. However, when the information detected and output by the sensor is distorted, shielded or invalid, the automatic control will have errors.

Today's autonomous driving technology has a decision center that assumes the physical quantities detected by the sensors are all ideal values. The decision center does not consider the uncertainty of the physical quantities, nor adapts a decision function for uncertain data. Furthermore, since the sensor has sensing errors and insufficient stability, errors will occur in detections of positions and speeds. Although sensors sold on the market assert that the physical quantities transmitted to the decision center already contain margin of errors, the decision center does not take the errors into consideration when making a decision. Accordingly, if the decision function for the uncertainty of sensor data can be added, the accuracy of autonomous driving will be improved.

In addition to the sensor, controllers used in vehicles also have the same problem. A controller performs actions according to the received instructions or signals. However, in the daily situation of automatic driving, when the input signal value and the output signal value of the controller have errors, the automatic driving control of the vehicle cannot meet the precise requirements, thus increasing the risk of driving.

Therefore, how to provide a driving risk assessment and control decision-making method for autonomous vehicles has become an urgent research topic.

SUMMARY OF THE INVENTION

In view of the above problems, the present invention provides a driving risk assessment and control decision-making method for an autonomous vehicle, which includes:
detecting a surrounding state of a vehicle multiple times to generate multiple sensing signals by a sensor;
quantifying the multiple sensing signals to generate multiple sensing values, and calculating a sensing average value of the multiple sensing values by a processor;
calculating a sensing error value between each of the multiple sensing values and the sensing average value respectively, calculating a sensing error average value of the sensing error values, and calculating a sensing error variation value of the sensor by the processor;
calculating a sensing signal correction value by the processor based on the sensing error average value, the sensing error variation value and a sensor systematic error average value and a sensor systematic error variation value;
combining the multiple sensing values and the sensing signal correction value to generate multiple sensing signal reference values by the processor;
determining by the processor whether a first stability of the multiple sensing signal reference values falls within a first preset range;
wherein, when the multiple sensing signal reference values are steadily distributed in the first preset range, transmitting the multiple sensing signal reference values to a decision unit by the processor and generating a first risk prediction assessment value by the decision unit;
when the multiple sensing signal reference values are not steadily distributed in the first preset range, generating a second risk prediction assessment value by the decision unit; and
generating a control mechanism for the autonomous vehicle by a controller based on the first risk prediction assessment value or the second risk prediction assessment value.

The driving risk assessment and control decision-making method for an autonomous vehicle of the present invention integrates sensing error and systematic error of sensors to improve the accuracy of determining sensing error of the autonomous vehicle, thereby further improving the stability of the autonomous vehicle. In addition to the sensor, the present invention also integrates control error and systematic error of controllers to improve the accuracy of controlling error of the autonomous vehicle, thereby further improving the controllability of the autonomous vehicle. Furthermore, the present invention combines the risk prediction assessment value based on the sensing error and the systematic error of sensors and the risk prediction assessment value based on control error and systematic error of controllers, which makes the risk assessment and the control mechanism safer and more reliable.

DETAILED DESCRIPTION OF THE PREFERRED EMBODIMENTS

In the driving risk assessment and control decision-making method for the autonomous vehicle, sensors and controllers are installed in the vehicle. Each of the sensor detects signals around the vehicle. Each of the controllers controls the actions of the vehicle, such as a throttle controller and a steering wheel controller, etc., which are not limited in the present invention.

Figure 1A:
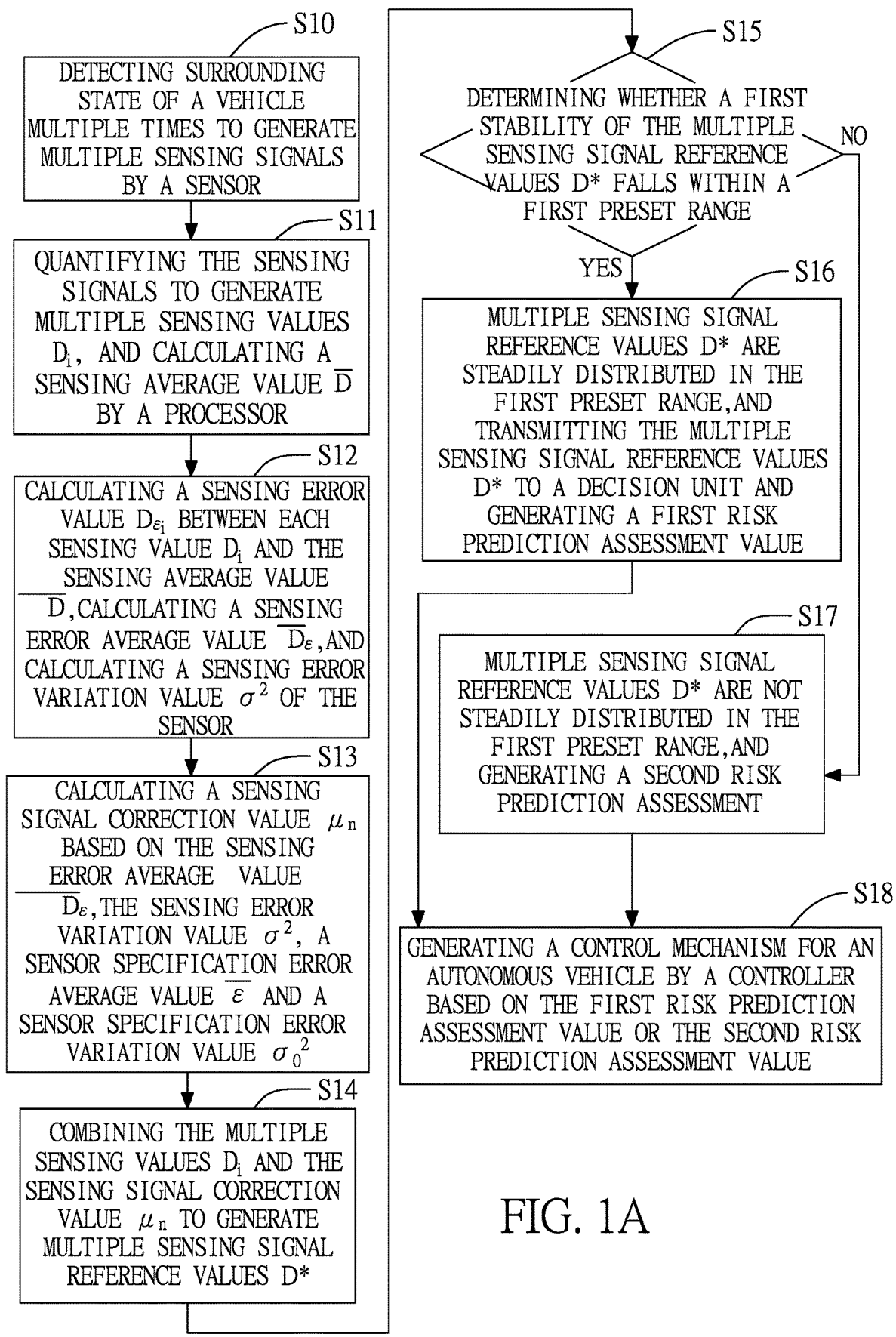
FIG. 1A is a flowchart of the driving risk assessment and control decision-making method of the present invention.

Referring to FIG. 1A, the driving risk assessment and control decision-making method for an autonomous vehicle comprises:

S10: detecting a surrounding state of a vehicle multiple times to generate multiple sensing signals by a sensor;

S11: quantifying the sensing signals to generate multiple sensing values $D_i$, and calculating a sensing average value $\overline{D}$ of the multiple sensing values $D_i$ by a processor;

S12: calculating a sensing error value $D_{\varepsilon i}$ between each of the multiple sensing values $D_i$ and the sensing average value $\overline{D}$ respectively, calculating a sensing error average value $\overline{D_\varepsilon}$ of sensing error values $D_{\varepsilon i}$, and calculating a sensing error variation value $\sigma^2$ of the sensor by the processor;

S13: calculating a sensing signal correction value $\mu_n$ by the processor based on the sensing error average value $\overline{D_\varepsilon}$, the sensing error variation value $\sigma^2$ and a sensor systematic error average value $\overline{\varepsilon}$ and a sensor systematic error variation value $\sigma_0^2$;

S14: combining the multiple sensing values $D_i$ and the sensing signal correction value $\mu_n$ to generate multiple sensing signal reference values $D^*$ by the processor;

S15: determining by the processor whether a first stability of the multiple sensing signal reference values $D^*$ falls within a first preset range;

S16: when the multiple sensing signal reference values $D^*$ are steadily distributed in the first preset range, transmitting the multiple sensing signal reference values $D^*$ to a decision unit by the processor and generating a first risk prediction assessment value by the decision unit;

S17: when the multiple sensing signal reference values $D^*$ are not steadily distributed in the first preset range, generating a second risk prediction assessment value by the decision unit; and S18: generating a control mechanism for the autonomous vehicle by a controller based on the first risk prediction assessment value or the second risk prediction assessment value. The formula of the sensor's sensing error variation value $\sigma^2$ is shown as follows.

$$\sigma^2 = \frac{\sum (D_{\varepsilon i} - \overline{D_\varepsilon})^2}{n}$$

wherein n is a positive integer.

In autonomous driving, the sensor needs to obtain information from the surrounding environment as a reference for automatic driving. Therefore, the sensor needs to detect various environmental conditions and accordingly generates a sensing signal. In an embodiment of the present invention, the sensing signal may include, but not limited to, an obstacle intention signal, an object distance signal, a vehicle light signal, and a traffic light signal. The obstacle intentions include the movement direction intentions of animals, pedestrians, and vehicles. By detecting moving directions of animals, pedestrians, and vehicles, the obstacle intention signals are generated respectively. By detecting object distances between the sensor and the surrounding animals, pedestrians and vehicles, the object distance signals are generated respectively. By detecting surrounding vehicle lights through the sensor, including brake lights, turning lights, and head/tail lights, the vehicle light signals are generated respectively. Taking the obstacle intention signal as an example, the obstacle intention can be predicted by the angle change formed between the moving direction of the obstacle and the vehicle, and the obstacle intention signal is generated by the sensor that senses the obstacle intention. Taking the traffic light signal and the vehicle light signal as an example, the physical signal of lights can be converted into respective digits, that is, the quantity of the light signal can be represented by numbers, for example, a green light of the traffic light is represented by the number 1, a red light of the traffic light is represented by the number 2, and a right turning light of the vehicle is represented by the number 3. So, after the sensing physical signals are quantified into the sensing values, the risk prediction assessment value is calculated according to the above method.

Figure 1B:
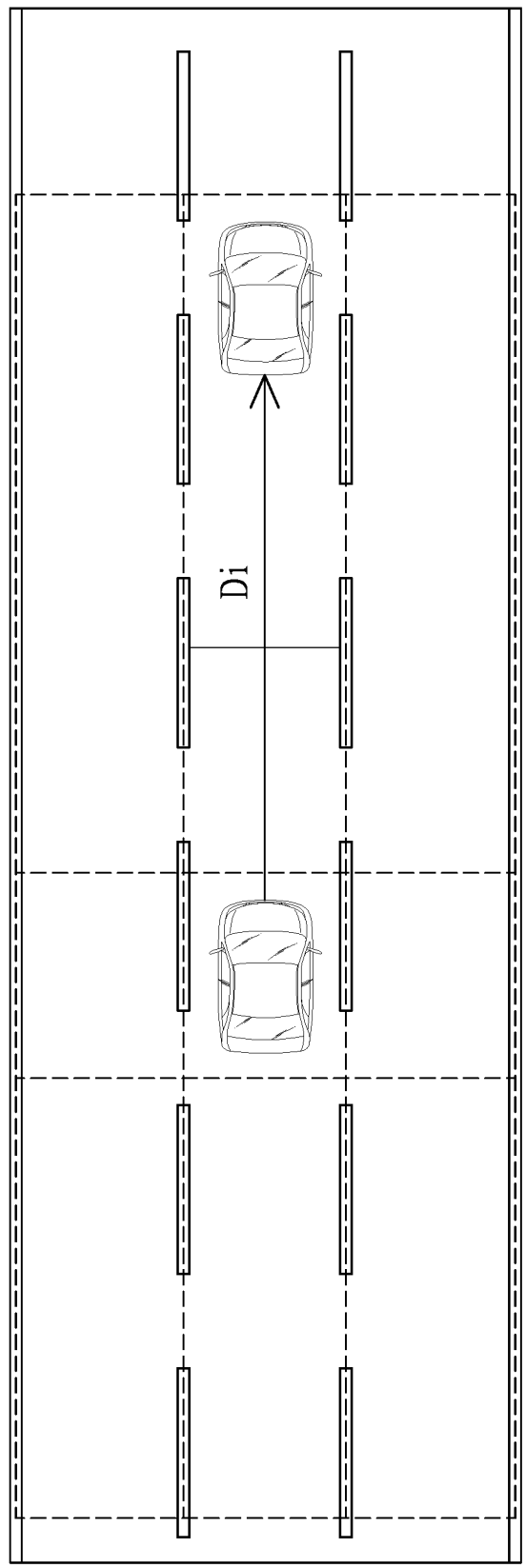
FIG. 1B is a schematic diagram showing the vehicle distance applied in the driving risk assessment and control decision-making method of the present invention.
Figure 4A:
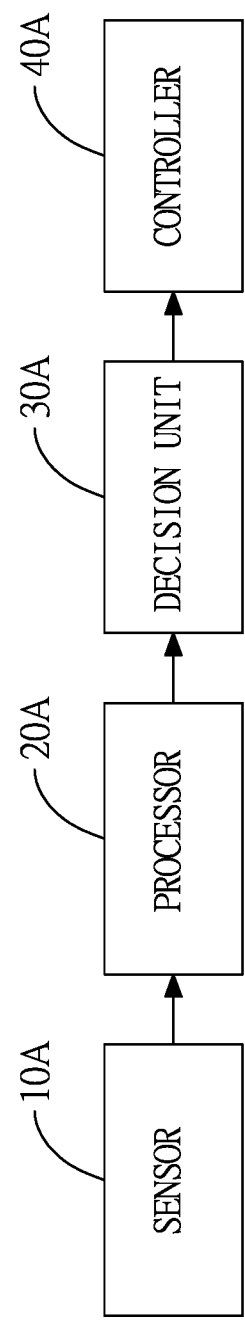
FIG. 4A is a block diagram of a sensor, a processor, and a controller used in the driving risk assessment and control decision-making method in FIG. 1A.

Further referring to FIG. 1B and FIG. 4A, in step S10, a sensor 10A senses a surrounding vehicle multiple times to generate multiple sensing signals. In step of S11, a processor 20A quantifies each sensing signal to generate multiple sensing values $D_i$, and calculates an average of the multiple sensing values $D_i$ to generate a sensing average value $\overline{D}$. In the following embodiments, the sensing signals are distance sensing signals of the object as an example, that is, the distance between a present vehicle and an in-front vehicle sensed by the sensor 10A is taken as the example. However, if the present vehicle is surrounded by multiple surrounding vehicles, i.e. 8 surrounding vehicles distributed along different radiation directions at most, the sensor 10A will detect all surrounding vehicles. To simplify the description, only the distance between the present vehicle and one in-front vehicle is taken as an example.

After the distance sensing signals generated by the sensor 10A are quantified, statistics of the distance sensing values $D_i$ may show a tendency of exponential families including different distributions such as a normal distribution, an exponential distribution and a Weibull distribution. The statistics are stored in a storage module. In addition, the distance sensing average value $\overline{D}$ is also stored in the storage module, and is calculated, compared and accessed by the processor 20A. Taking the normal distribution as an example, the sensor 10A measures the distance between the present vehicle and the in-front vehicle three times, and the processor 20A quantifies the distance sensing signals to distance sensing values $D_1$, $D_2$, $D_3$ and calculates the distance sensing average value $\overline{D}$ in the step S11. The formula of the distance sensing average value $\overline{D}$ is as follows:

$$\left(\overline{D} = \frac{D_1 + D_2 + D_3}{3}\right)$$

In step S12, the processor 20A calculates sensing error values $D_{\varepsilon 1}$, $D_{\varepsilon 2}$, $D_{\varepsilon 3}$ based on the distance sensing values $D_1$, $D_2$, $D_3$ and the distance sensing average value $\overline{D}$, and calculates a sensing error average value $\overline{D_\varepsilon}$ of the sensing error values $D_{\varepsilon i}$. The formula of the sensing error average value $\overline{D_\varepsilon}$ is as follows:

$$\overline{D_\varepsilon} = \frac{D_{\varepsilon 1} + D_{\varepsilon 2} + D_{\varepsilon 3}}{3}$$

Furthermore, the processor 20A calculates differences between each distance sensing value $D_i$ and the distance sensing average value $\overline{D}$ to obtain the sensing error value $D_\varepsilon$. The differences are further calculated through statistical methods to obtain a variance value $\sigma^2$. The dispersion degree of the sensor 10A sensing value $D_i$ can be obtained by observing the variation value $\sigma^2$. The formula of the sensing error value $D_\varepsilon$ and the sensing error variation value $\sigma^2$ is as follows:

$$D_\varepsilon = D_i - \overline{D}$$

wherein $D_\varepsilon$ is the sensing error value, $D_i$ is the sensing value, and $\overline{D}$ is the sensing average value.

$$\sigma^2 = \frac{\sum (D_{\varepsilon i} - \overline{D_\varepsilon})^2}{n}$$

wherein $\sigma^2$ is the sensing error variation value, $\overline{D_\varepsilon}$ is the sensing error average value, $D_{\varepsilon i}$ is the sensing error values, and n is a positive integer.

Because the sensor 10A cannot achieve 100% sensing accuracy, the sensor 10A has a systematic error, which is measured multiple times to obtain multiple systematic error values. The statistics of the sensor systematic error values may show a normal distribution, an exponential distribution, a Weibull distribution, etc. A sensor systematic error average value E is calculated based on the sensor systematic error values. Therefore, in step S13, the processor 20A integrates the distance sensing error average value $\overline{D_\varepsilon}$, the distance sensing error variation value $\sigma^2$, the sensor systematic error average value $\overline{\varepsilon}$, and the sensor systematic error variation value $\sigma_0^2$ to generate a distance signal correction value $\mu_n$ of the sensor 10A. The formula of the distance signal correction value $\mu_n$ is as follows:

$$\mu_n = \frac{\sigma^2}{n\sigma_0^2 + \sigma^2}\overline{\varepsilon} + \frac{n\sigma_0^2}{n\sigma_0^2 + \sigma^2}\overline{D_\varepsilon}$$

wherein $\sigma_0^2$ is the sensor systematic error variation value, $\sigma^2$ is the sensing error variation value:

$$\sigma^2 = \frac{\sum_i^n (D_{\varepsilon i} - \overline{D_\varepsilon})^2}{n}$$

wherein $\overline{D_\varepsilon}$ is the sensing error average value, $$\frac{\sigma^2}{n\sigma_0^2 + \sigma^2}$$

is a weight ratio for the sensor systematic error average value $\overline{\varepsilon}$ and $$\frac{n\sigma_0^2}{n\sigma_0^2 + \sigma^2}$$

is another weight ratio for the sensing error average value $\overline{D_\varepsilon}$.

After calculating the distance sensing signal correction value $\mu_n$, the processor 20A combines the multiple sensing values $D_i$ and the sensing signal correction value $\mu_n$ to generate multiple sensing signal reference values D* in step S14. Accordingly, in the present invention, the calculation of the sensing signal reference values D* combines the sensing signal correction value $\mu_n$, which makes the calculation result more accurate. The formula of the sensing signal reference value D* is:

$$D^* = D_i + \mu_n$$

Wherein D* is the sensing signal reference value, $D_i$ is the sensing value $D_i$, and $\mu_n$ is the sensing signal correction value.

After calculating the sensing signal reference value D*, the processor 20A determines whether a first stability of the multiple sensing signal reference values D* is within a first preset range in step S15. Two ways to determine whether the first stability is in the first preset range are disclosed in this embodiment of the present invention.

The first way is to judge whether a discrete variation degree V* of the multiple sensing signal reference values D* is steadily smaller than a threshold value. If the discrete variation degree V* is steadily smaller than the threshold value, it means that a certain percentage of the sensing signal reference values D* generated in a period of time are controllable values. In the embodiment of the present invention, the certain percentage may be, but not limit to, 30%, 40%, 50%, 60%, 70%, 80% or 90%. Then it is determined that the multiple sensing signal reference values D* are steadily within the first preset range. The processor 20A transmits the multiple sensing signal reference values D* to a decision unit 30A, and the decision unit 30A generates a first risk prediction assessment value accordingly.

If the discrete variation degree V* is unsteadily smaller than the threshold value, it means that a certain percentage of the sensing signal reference values D* generated in a period of time are uncontrollable values. Then it is determined that the multiple sensing signal reference values D* are not distributed within the first preset range. The processor 20A does not transmit the multiple sensing signal reference values D* to the decision unit 30A, and the decision unit 30A generates a second risk prediction assessment value accordingly.

The second way is to judge whether the multiple sensing values $D_i$ steadily fall within a statistical distribution confidence interval with an upper limit value UCL and a lower limit value LCL. If the multiple sensing values $D_i$ steadily fall between the upper limit value UCL and the lower limit value LCL of the statistical distribution confidence interval, it means that a certain percentage of the sensing signal reference values D* (a first number of the sensing signal reference values D*) generated in a period of time steadily fall within the statistical distribution confidence interval. Then it is determined that a first stability of the multiple sensing values $D_i$ falls within the first preset range. That is, after the correction of the above steps, the generated reference values D* of the multiple sensing signals are controllable values, the processor 20A transmits the multiple sensing signal reference values D* to the decision unit 30A, and the decision unit 30A generates the first risk prediction assessment value accordingly.

If the multiple sensing values $D_i$ are not steadily distributed between the upper limit value UCL and the lower limit value LCL of the statistical distribution confidence interval, it means that a certain percentage of the sensing signal reference values D* (a first number of the sensing signal reference values D*) generated in a period of time are not within the statistical distribution confidence interval. Then it is determined that the first stability of the multiple sensing values $D_i$ does not fall within the first preset range. That is, after the correction of the above steps, the generated reference values D* of the multiple sensing signals are uncontrollable values. The processor 20A does not transmit the multiple sensing signal reference values D* to the decision unit 30A, and the decision unit 30A generates the second risk prediction assessment value accordingly. In the embodiment of the present invention, the certain percentage may be 30%, 40%, 50%, 60%, 70%, 80% or 90%. The upper limit value UCL and the lower limit value LCL are determined by a second weight ratio α of the multiple sensing signal reference values D* and the discrete variation degree V* of the multiple sensing signal reference values D*. The formula for the discrete variation degree V* of the sensing signal reference values D* is as follows:

$$V^* = \left(\frac{n}{\sigma^2} + \frac{1}{\sigma_0^2}\right)^{-1}$$

If the sensing value is not in the statistical distribution confidence interval, the control mechanism for the autonomous vehicle will be activated and display a warning message. Taking the distance sensing value $D_i$ as an example, if the distance sensing value $D_i$ exceeds the upper limit value UCL of the statistical distribution confidence interval, it means that the vehicle may have risks, such as, a cross-lane risk. Then the control mechanism is forced to intervene and displays a warning message. If the distance sensing value $D_i$ exceeds the lower limit value LCL of the statistical distribution confidence interval, it means that the vehicle may have a risk of collision with obstacles. In other words, there may be other vehicles or obstacles in front of the present vehicle, and the present vehicle cannot get across directly, otherwise it will hit other vehicles or obstacles. At this time, the control mechanism is forced to intervene and displays a warning message. When the distance sensing values $D_i$ steadily fall within the upper limit value UCL and lower limit value LCL of the statistical distribution confidence interval, a safety message is displayed and the control mechanism controls the vehicle to implement an automatic driving mechanism or a vehicle trajectory prediction mechanism. The formulas of the upper limit value UCL and the lower limit value LCL of the statistical distribution confidence interval are as follows:

UCL=$D^*+\alpha V^*$

LCL=$D^*-\alpha V^*$ wherein UCL is the upper limit value, LCL is the lower limit value, and α is the second weight radio.

In addition, each sensing value, the upper limit UCL and the lower limit LCL of the statistical distribution confidence interval are all stored in the storage module. When the same or similar data is generated later, it can be loaded into the processor 20A from the storage module without recalculation, and the processor 20A performs corresponding actions according to the loaded data to save computing time. The second weight ratio α is a weight factor, which can be obtained by a look-up table or calculated by a mathematical method. In the embodiment of the present invention, for the normal distribution, the second weight ratio α can be obtained by a look-up table. For the exponential distribution or the Weibull distribution, the second weight ratio α is obtained through a mathematical method.

After determining the first stability of the multiple sensing signal reference values D*, the controller 40A executes corresponding actions according to the determination result in step S18. For example, in the first way to judge whether the first stability of the multiple sensing signal reference values D* falls within the first preset range, if the discrete variation degree V* of the multiple sensing signal reference values D* is steadily smaller than the threshold value, a controller 40A will execute the autonomous driving mechanism or the vehicle trajectory prediction mechanism. If the discrete variation degree V* is unsteadily smaller than the threshold value, the controller 40A executes the human driving mechanism. In the second way, if the multiple sensing values $D_i$ steadily fall between the upper limit value UCL and the lower limit value LCL of the statistical distribution confidence interval, the controller 40A executes the automatic driving mechanism or the vehicle trajectory prediction mechanism. If the multiple sensing values $D_i$ are not distributed between the upper limit value UCL and the lower limit value LCL of the statistical distribution confidence interval, the controller 40A executes the human driving mechanism.

The controller 40A executes corresponding actions according to whether the first stability of the multiple sensing signal reference values D* falls within the first preset range. The decision unit 30A generates the corresponding risk prediction assessment value based on the judgment result. In particular, the decision unit 30A calculates whether the discrete variation degree V* is steadily smaller than the threshold value and whether multiple sensing values $D_i$ are distributed between the upper limit value UCL and the lower limit value LCL of the statistical distribution confidence interval through mathematical formulas, then generates the first risk prediction assessment value representing low risk or the second risk prediction assessment value representing high risk. The mathematical formulas will not be further described here.

The risk prediction assessment value includes a collision risk prediction assessment value, a cross-lane risk prediction assessment, a red-light-running risk prediction assessment value, a retrograding risk prediction assessment value, and an acceleration and deceleration risk prediction assessment value. Each risk prediction assessment value corresponds to a risk coefficient value. The risk prediction assessment value of high-risk represents a more dangerous situation, so its risk coefficient value is larger. The risk prediction assessment value of low-risk represents a relatively safe situation, so its risk coefficient value is smaller.

When the decision unit 30A generates the first risk prediction assessment value, the processor 20A then determines whether the first risk prediction assessment value is lower than the collision risk prediction assessment value. If the processor 20A determines the first risk prediction assessment value is lower than the collision risk prediction assessment value, the processor 20A transmits the first control signal to the controller 40A to execute an automatic driving mechanism or a vehicle trajectory prediction mechanism. If the processor 20A determines the first risk prediction assessment value is not lower than the collision prediction assessment value, the processor 20A transmits a second control signal to the controller 40A to execute a human driving mechanism. If the decision unit 30A generates the second risk prediction assessment value, the processor 20A determines whether the second risk prediction assessment value is lower than the collision risk prediction assessment value. If the processor 20A determines the first risk prediction assessment value is lower than the collision risk prediction assessment value, the processor 20A transmits a third control signal to the controller 40A to execute a human driving mechanism. The formula of the risk coefficient value R is as follows:

$$R = \frac{wa}{wa+b}$$

wherein w is a weight coefficient, a is a dangerous event value, and b is a safe event value.

After the calculation of the risk coefficient value R, in step S18, the controller 40A generates a control mechanism according to the first risk prediction assessment value or the second risk prediction assessment value. The control mechanism includes the human driving mechanism, the autonomous driving mechanism and the vehicle trajectory prediction mechanism. For example, when the risk coefficient value R is large, it means that the current probability of collision is higher, so it is not suitable for autonomous driving mechanism but a human driving mechanism.

Figure 2:
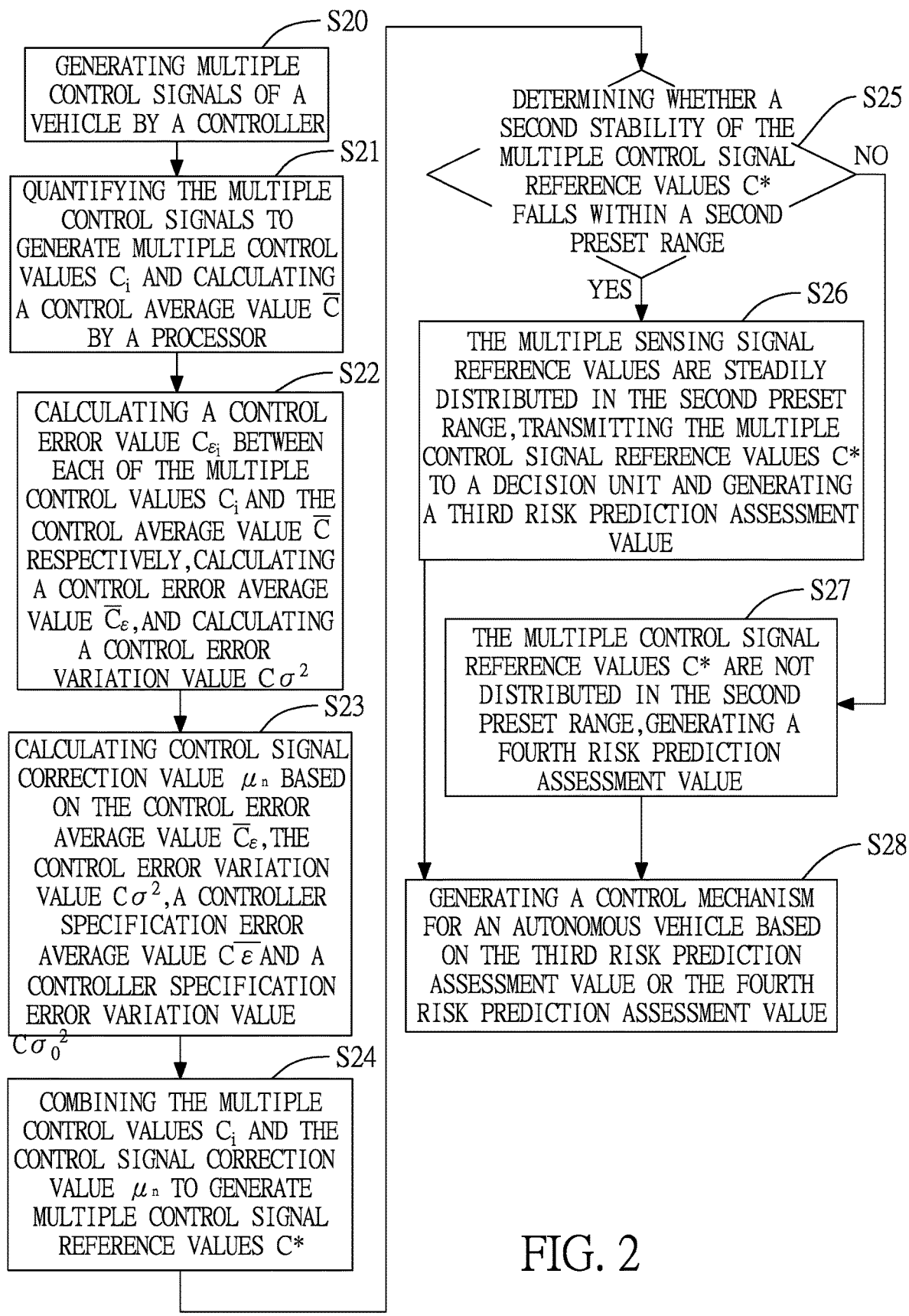
FIG. 2 is a flowchart of another embodiment of the driving risk assessment and control decision-making method of the present invention.
Figure 4B:
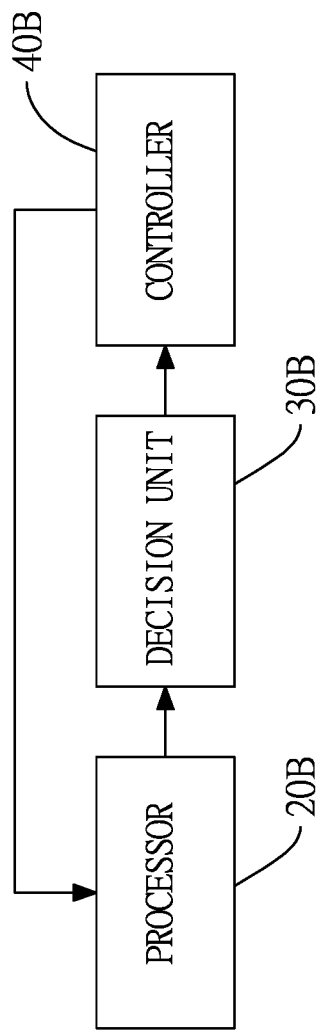
FIG. 4B is a block diagram of a sensor, a processor, and a controller used in the driving risk assessment and control decision-making method in FIG. 2.

Referring to FIG. 2 and FIG. 4B, FIG. 2 shows a flowchart of the second embodiment of the driving risk assessment and control decision-making method. The first embodiment discussed in FIG. 4A shows a method of correcting sensing error and systematic error for the sensor. This second embodiment is a method of correcting control error and systematic error for a controller 40B. The method includes:

S20: generating multiple control signals of a vehicle by a controller 40B;

S21: quantifying the multiple control signals to generate multiple control values $C_i$ and calculating a control average value $\overline{C}$ of the multiple control values $C_i$ by a processor 20B;

S22: calculating a control error value $C_{\varepsilon i}$ between each of the multiple control values $C_i$ and the control average value $\overline{C}$ respectively, calculating a control error average value $\overline{C_\varepsilon}$ of the control error values $C_{\varepsilon i}$, and calculating a control error variation value $C\sigma^2$ of the controller 40B by the processor 20B;

S23: calculating a control signal correction value $\mu_n$ of the controller 40B by the processor 20B based on the control error average value $\overline{C_\varepsilon}$, the control error variation value $C\sigma^2$ and a controller systematic error average value $C\overline{\varepsilon}$ and a controller systematic error variation value $C\sigma_0^2$;

S24: combining the multiple control values $C_i$ and the control signal correction value $\mu_n$ to generate multiple control signal reference values C* by the processor 20B;

S25: determining by the processor 20B whether a second stability of the multiple control signal reference values C* falls within a second preset range;

S26: when the multiple sensing signal reference values are steadily distributed in the second preset range, transmitting the multiple control signal reference values C* to a decision unit 30B by the processor 20B and generating a third risk prediction assessment value by the decision unit 30B;

S27: when the multiple control signal reference values C* are not distributed in the second preset range, the processor 20B not transmit the multiple control signal reference values C* to the decision unit, and generating a fourth risk prediction assessment value by the decision unit 30B; and S28: generating a control mechanism for an autonomous vehicle by the controller 40B based on the third risk prediction assessment value or the fourth risk prediction assessment value.

The control signals include, but not limited to, steering wheel control signals, brake control signals, throttle control signals, etc. For judging the second stability, there are also two ways similar to those in the foregoing embodiment, and are not repeated here. The control error value and systematic error value correction of the controller 40B can be completed according to the above-mentioned steps. The calculation is similar to the first embodiment, and the same content will not be repeated here.

Figure 3A:
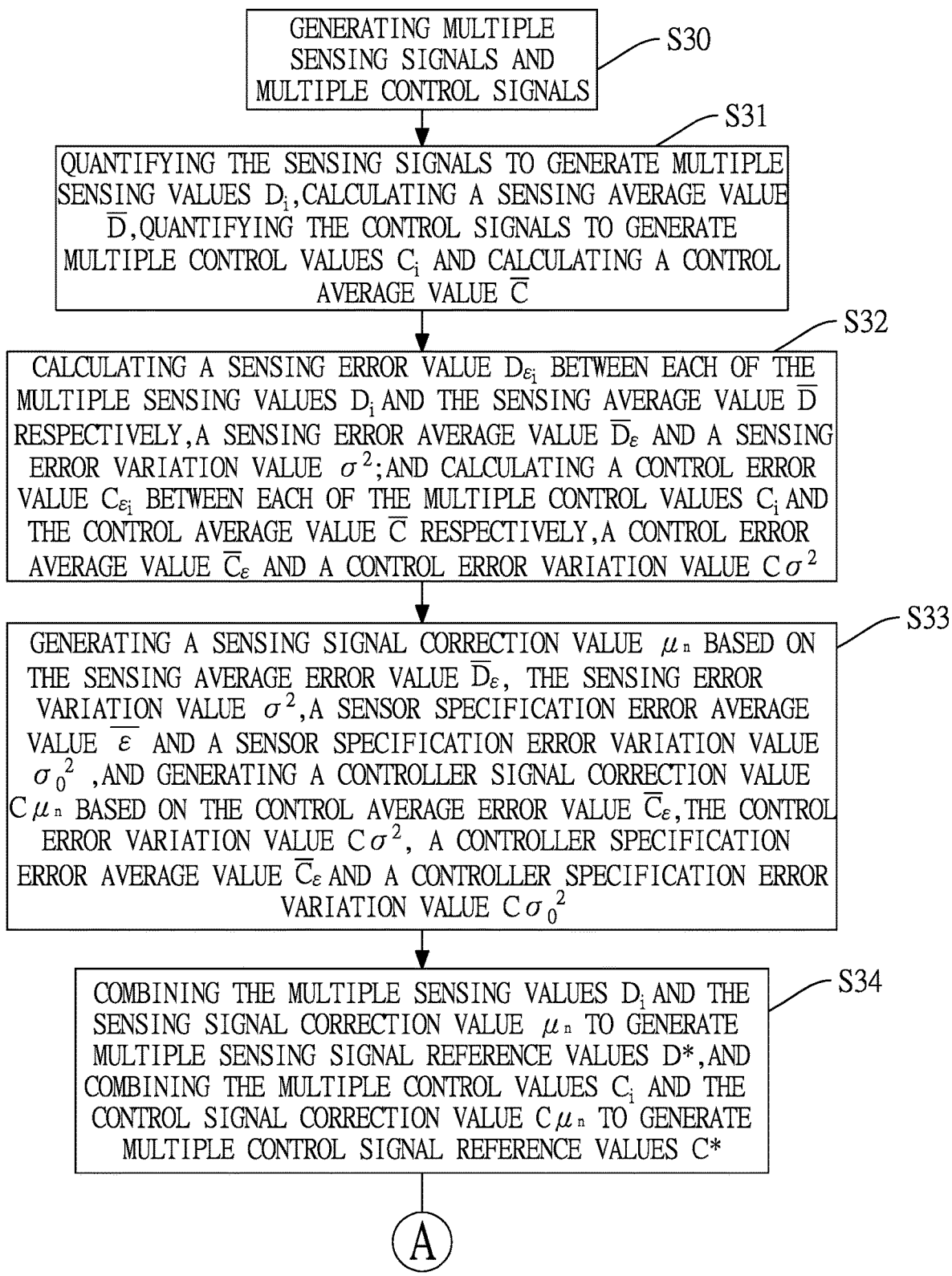
FIGS. 3A and 3B show a flowchart of another embodiment of the driving risk assessment and control decision-making method of the present invention.
Figure 3B:
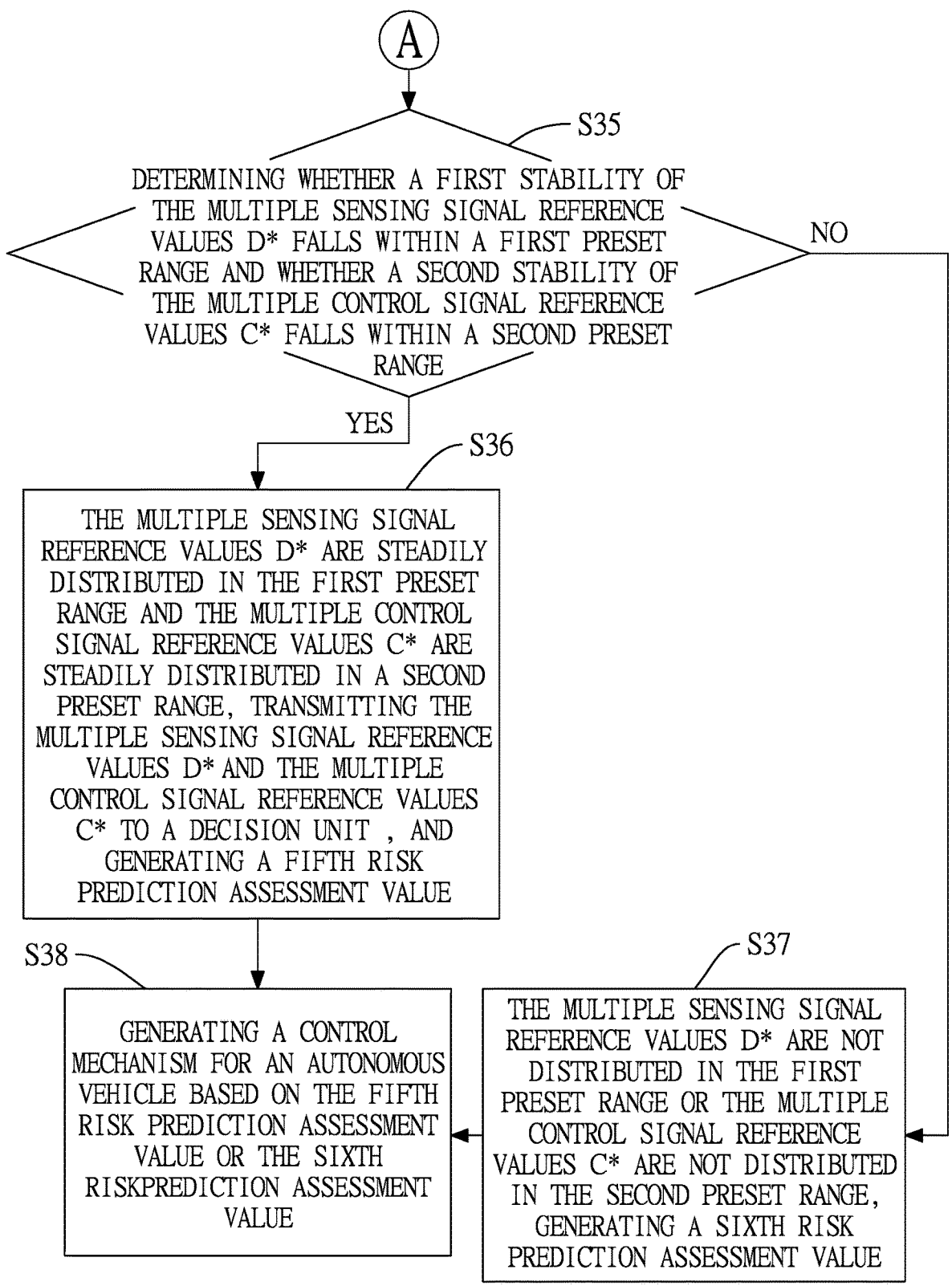

The embodiments of FIG. 1A and FIG. 2 respectively disclose methods for correcting errors of the sensor and the controller. In the third embodiment shown in FIGS. 3A-3B and 4C, a method for correcting errors of both the sensor and the controller is disclosed, the method comprising:

S30: detecting a surrounding state of a vehicle multiple times to generate multiple sensing signals by a sensor 10C, and generating multiple control signals by a controller 40C;

S31: quantifying the sensing signals to generate multiple sensing values $D_i$, calculating a sensing average value $\overline{D}$ of the multiple sensing values $D_i$, quantifying the control signals to generate multiple control values $C_i$ and calculating a control average value $\overline{C}$ of the multiple control values $C_i$ by a processor 20C;

S32: calculating a sensing error value $D_{\varepsilon i}$ between each of the multiple sensing values $D_i$ and the sensing average value $\overline{D}$ respectively, a sensing error average value $\overline{D_\varepsilon}$ of sensing error values $D_{\varepsilon i}$ and a sensing error variation value $\sigma^2$ of the sensor 10C, and calculating a control error value $C_{\varepsilon i}$ between each of the multiple control values $C_i$ and the control average value $C_E$ respectively, a control error average value $\overline{C_\varepsilon}$ of control error values $C_{\varepsilon i}$ and a control error variation value $C\sigma^2$ of the controller 40C by the processor 20C;

S33: generating a sensing signal correction value $\mu_n$ based on the sensing error average value of $D_\varepsilon$, the sensing error variation value $\sigma^2$, a sensor systematic error average value $\overline{\varepsilon}$ and a sensor systematic error variation value $\sigma_0^2$, and generating a controller signal correction value $C\mu_n$ based on the control average error value $\overline{C_\varepsilon}$, the control error variation value $C\sigma^2$, a controller systematic error average value $C\overline{\varepsilon}$ and a controller systematic error variation value $C\sigma_0^2$ by the processor 20C;

S34: combining the multiple sensing values $D_i$ and the sensing signal correction value $\mu_n$ to generate multiple sensing signal reference values D*, and combining the multiple control values $C_i$ and the control signal correction value $C\mu_n$ to generate multiple control signal reference values C* by the processor 20C;

S35: determining whether a first stability of the multiple sensing signal reference values D* falls within a first preset range and whether a second stability of the multiple control signal reference values C* falls within a second preset range, by the processor 20C;

S36: when the multiple sensing signal reference values D* are steadily distributed in the first preset range and the multiple control signal reference values C* are steadily distributed in a second preset range, transmitting the multiple sensing signal reference values D*and the multiple control signal reference values C* to a decision unit 30C by the processor 20C, and generating a fifth risk prediction assessment value by the decision unit 30C;

S37: when the multiple sensing signal reference values D* are not distributed in the first preset range or the multiple control signal reference values C* are not distributed in the second preset range, the processor 20C does not transmit the multiple sensing signal reference values D* or the control signal reference values C* to the decision unit 30C, and the decision unit 30C generates a sixth risk prediction assessment value; and S38: generating a control mechanism for the autonomous vehicle by the controller 40C based on the fifth risk prediction assessment value or the sixth risk prediction assessment value.

The fifth risk prediction assessment value is a combination of the first risk prediction assessment value and the third risk prediction assessment value in the above embodiment. The sixth risk prediction assessment value is a combination of the second risk prediction assessment value and the fourth risk prediction assessment value in the above embodiment. The controller 40C generates a control mechanism corresponding to the fifth risk prediction assessment value and the sixth risk prediction assessment value, which is similar to the above and will not be repeated here.

As the fifth risk prediction assessment value and the sixth risk prediction assessment value comprehensively consider two risk prediction assessment values, as long as any one of the risk prediction assessment values is high, the fifth risk prediction assessment value and the sixth risk prediction assessment value are determined as high risk. For example, if the first risk prediction assessment value or the third risk prediction assessment value is high risk, the fifth risk prediction assessment value is determined as high risk. If the second risk prediction assessment value or the fourth risk prediction assessment value is high risk, the sixth risk prediction assessment value is determined as high risk. Only when the first risk prediction assessment value and the third risk prediction assessment value are both low risk, the fifth risk prediction assessment value is determined as low risk. Only when the second risk prediction assessment value and the fourth risk prediction assessment value are both low risk, the sixth risk prediction assessment value is determined as low risk.

Based on the above steps, the sensing error value and systematic error value of the sensor, and the control error value and systematic error value of the controller can be corrected. The calculation is similar to the above, and will not be repeated again.

FIG. 4A shows that the sensor 10A calculates the sensing signal reference values D* according to the above steps and inputs the sensing signal reference values D* into the processor 20A. The processor 20A determines whether the sensing signal reference values D* are controllable and transmits sensing signal reference values D* to the decision unit 30A. The decision unit 30A generates a risk prediction assessment value based on this. The controller 40A generates a corresponding control mechanism according to the risk prediction assessment value.

Referring to FIG. 4B, it shows that the controller 40B feeds back the output control signal to the processor 20B, and calculates the control signal reference values C* according to the above steps and transmits the control signal reference values C* to the processor 20B. The processor 20B determines whether the control signal reference values C* are controllable and transmits control signal reference values C* to the decision unit 30B. The decision unit 30B generates a risk prediction assessment value based on this. The controller 40B generates a corresponding control mechanism according to the risk prediction assessment value.

Figure 4C:
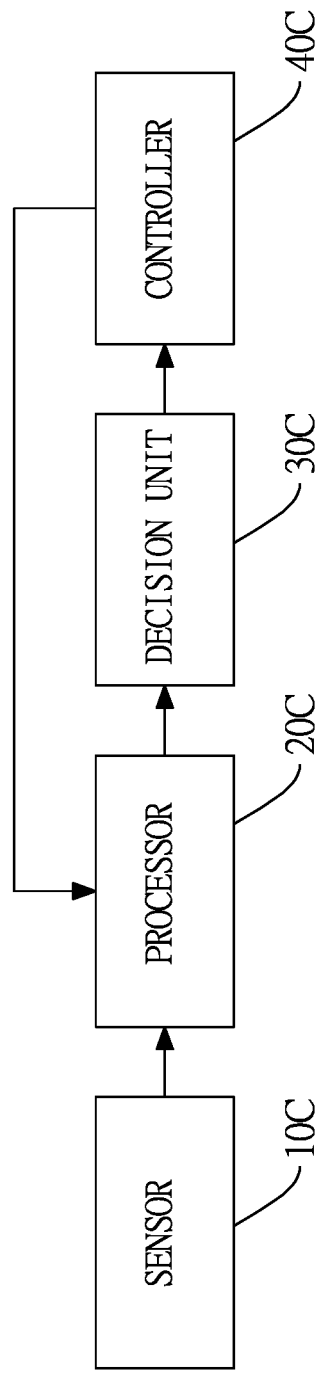
FIG. 4C is a block diagram of a sensor, a processor, and a controller used in the driving risk assessment and control decision-making method in FIG. 3.

Referring to FIG. 4C, the sensor 10C calculates the sensing signal reference values D* according to the above steps and inputs the sensing signal reference values D* into the processor 20C and the controller 40C feeds back the output control signal to the processor 20C, and calculates the control signal reference values C* according to the above steps and transmits the control signal reference values C* to the processor 20C. The processor 20C determines whether the sensing signal reference values D* and the control signal reference values C* are controllable and transmits them to the decision unit 30C. The decision unit 30C generates a risk prediction assessment value based on this. The controller 40C generates a corresponding control mechanism according to the risk prediction assessment value.

In addition, it should be noted that in FIG. 4B and FIG. 4C, the controller is directly connected to the processor, but in fact the controller here includes various control systems, and feeds back the control signals output by the system to the processor to correct the control signal, so that the control signal output by the controller becomes more accurate each time.

In summary, the driving risk assessment and control decision-making method of the autonomous vehicle of the present invention integrates sensing error and systematic error of sensor to improve the accuracy of the sensor of the autonomous vehicle, thereby further improving the stability of the autonomous vehicle. In addition to the sensor, the present invention also integrates control error and systematic error of the controller to improve the accuracy of controlling error of the autonomous vehicle, thereby further improving the controllability of the autonomous vehicle. Furthermore, the present invention combines the risk prediction assessment value based on the sensing error and the systematic error of the sensor and the risk prediction assessment value based on the controller control error and systematic error of controller, which makes the risk assessment and the control mechanism safer and more reliable.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A driving risk assessment and control decision-making method for an autonomous vehicle comprising:
   detecting a surrounding state of the autonomous vehicle multiple times to generate multiple sensing signals by a sensor;
   quantifying the multiple sensing signals to generate multiple sensing values, and calculating a sensing average value of the multiple sensing values by a processor;
   calculating a sensing error value between each of the multiple sensing values and the sensing average value respectively, calculating a sensing error average value of the sensing error values, and calculating a sensing error variation value of the sensor by the processor;
   calculating a sensing signal correction value by the processor based on the sensing error average value, the sensing error variation value and a sensor systematic error average value and a sensor systematic error variation value;
   combining the multiple sensing values and the sensing signal correction value to generate multiple sensing signal reference values by the processor;
   determining, by the processor, whether a first stability of the multiple sensing signal reference values falls within a first preset range;
   when the multiple sensing signal reference values are distributed in the first preset range, transmitting the multiple sensing signal reference values to a decision unit by the processor and generating a first risk prediction assessment value;

when the multiple sensing signal reference values are not distributed in the first preset range, generating a second risk prediction assessment value; and controlling autonomous driving of the autonomous vehicle by a controller based on the first risk prediction assessment value or the second risk prediction assessment value.

2. The method as claimed in claim 1, wherein the multiple sensing signals include obstacle intention signals, object distance signals, and vehicle light signals.

3. The method as claimed in claim 1, wherein the step of determining whether the first stability of the multiple sensing signal reference values falls within the first preset range further includes:

determining whether a discrete variation degree of the multiple sensing signal reference values is smaller than a threshold value;

when the discrete variation degree is smaller than the threshold value, determining that—the first stability of the multiple sensing signal reference values falls within the first preset range; and when the discrete variation degree is not smaller than the threshold value, determining that the first stability of the multiple sensing signal reference values does not fall within the first preset range.

4. The method as claimed in claim 1, wherein the step of determining whether the first stability of the multiple sensing signal reference values falls within the first preset range includes:

judging whether the multiple sensing values are distributed in a statistical distribution confidence interval with an upper limit value and a lower limit value;

when the multiple sensing values are distributed between the upper limit value and the lower limit value of the statistical distribution confidence interval, determining that the first stability of the multiple sensing signal reference values is in the first preset range and generating the first risk prediction assessment value;

when the multiple sensing values are not distributed between the upper limit value and the lower limit value of the statistical distribution confidence interval, determining that the first stability of the multiple sensing signal reference values is not in the first preset range and generating the second risk prediction assessment value;

wherein the step of determining whether the multiple sensing values are distributed in the statistical distribution confidence interval further includes steps of:

determining whether a first number of the multiple sensing values are distributed between the upper limit value and the lower limit value of the statistical distribution confidence interval;

when the first number of the multiple sensing values are distributed between the upper limit value and the lower limit value, determining the first stability of the multiple sensing signal reference values is in the first preset range;

when the first number of the multiple sensing values are not distributed between the upper limit value and the lower limit value, determining the first stability of the multiple sensing signal reference values is not in the first preset range;

wherein the upper limit value and the lower limit value are determined by a second weight ratio of the multiple sensing signal reference values and the discrete variation degree of the multiple sensing signal reference values.

5. The method as claimed in claim 4, wherein the second weight ratio is generated by a lookup table.

6. The method as claimed in claim 4, wherein the multiple sensing values, the upper limit value and the lower limit value are calculated, compared and accessed by the processor.

7. The method as claimed in claim 1, wherein when the first risk prediction assessment value is generated, the processor determines whether the first risk prediction assessment value is lower than a collision risk prediction assessment value;

wherein, when determining that the first risk prediction assessment value is lower than the collision risk prediction assessment value, the processor transmits a first control signal to the controller to execute an automatic driving mechanism or a vehicle trajectory prediction mechanism for the autonomous vehicle; and wherein, when determining that the first risk prediction assessment value is not lower than the collision prediction assessment value, the processor transmits a second control signal to the controller to execute a human driving mechanism for the autonomous vehicle.

8. The method as claimed in claim 7, wherein when the second risk prediction assessment value is generated, the processor determines whether the second risk prediction assessment value is lower than the collision risk prediction assessment value; and when determining that the second risk prediction assessment value is lower than the collision prediction assessment value, the processor transmits a third control signal to the controller to execute the human driving mechanism.

9. The method as claimed in claim 1, further comprising:

generating multiple control signals of the vehicle by the controller;

quantifying the multiple control signals by the processor to generate multiple control values, and then calculating a control average value of the multiple control values;

calculating control error values according to the multiple control values and the control average value, a control error average value of the control error values, and a control error variation value of the controller;

integrating the control error average value, the control error variation value, a controller systematic error average value, and a controller systematic error variation value by the processor to generate a control signal correction value of the controller;

combining the multiple control values and the control signal correction value for a calculation to generate multiple control signal reference values by the processor;

determining, by the processor, whether a second stability of the multiple control signal reference values falls within a second preset range;

wherein, when the multiple control signal reference values are distributed in the second preset range, transmitting the multiple control signal reference values to the decision unit by the processor, and generating a third risk prediction assessment value;

wherein, when the multiple control signal reference values are not distributed within the second preset range, generating a fourth risk prediction assessment value; and controlling autonomous driving of the autonomous vehicle by the controller according to the third risk prediction assessment value or the fourth risk prediction assessment value.

10. The method as claimed in claim 9, wherein:

when the first risk prediction assessment value and the third risk prediction assessment value are generated, the processor transmits a fourth control signal to the controller to execute an automatic driving mechanism or a vehicle trajectory prediction mechanism; and when the second risk prediction assessment value or the fourth risk prediction assessment value is generated, the processor transmits a fifth control signal to the controller to execute a human driving mechanism.

\* \* \* \* \*